United States Patent
Kobayashi

(10) Patent No.: US 7,907,314 B2
(45) Date of Patent: Mar. 15, 2011

(54) IMAGE FORMING APPARATUS

(75) Inventor: Junji Kobayashi, Fukushima (JP)

(73) Assignee: Oki Data Corporation, Tokyo (JP)

( * ) Notice: Subject to any disclaimer, the term of this patent is extended or adjusted under 35 U.S.C. 154(b) by 1207 days.

(21) Appl. No.: 11/058,300

(22) Filed: Feb. 16, 2005

(65) Prior Publication Data

US 2005/0185993 A1    Aug. 25, 2005

(30) Foreign Application Priority Data

Feb. 19, 2004   (JP) ................................. 2004-042574

(51) Int. Cl.
*G06K 15/02*    (2006.01)

(52) U.S. Cl. ...... 358/504; 358/1.11; 358/1.14; 358/1.15; 399/81; 399/82

(58) Field of Classification Search .................. 358/1.1, 358/1.14, 1.15, 504; 399/81, 82
See application file for complete search history.

(56) References Cited

U.S. PATENT DOCUMENTS

| 5,930,551 A | * | 7/1999 | Nakazato et al. | 399/1 |
| 5,987,224 A | * | 11/1999 | Koakutsu et al. | 358/1.12 |
| 2004/0101336 A1 | * | 5/2004 | Azami | 400/61 |

FOREIGN PATENT DOCUMENTS

| JP | 7-137358 | 5/1995 |
| JP | 8-314652 | 11/1996 |
| JP | H9-368 | 6/1997 |
| JP | 10-44564 | 2/1998 |

* cited by examiner

*Primary Examiner* — Twyler L Haskins
*Assistant Examiner* — Kent Yip
(74) *Attorney, Agent, or Firm* — Rabin & Berdo, PC

(57) ABSTRACT

An image forming apparatus has a mode selector that can select a mode of operation in which the image forming apparatus remains online despite an empty printing media container or another error condition. This mode enables a host device to switch from an empty printing media container to a printing media container that is not empty, a feature useful during normal operation, or to continue to issue commands and make settings despite the presence of an error, a feature useful during tests and inspection of the image forming apparatus. Tests and inspection are also facilitated by a mode that simulates the presence of non-installed optional printing media containers, or disables counters and resets error priorities.

10 Claims, 12 Drawing Sheets

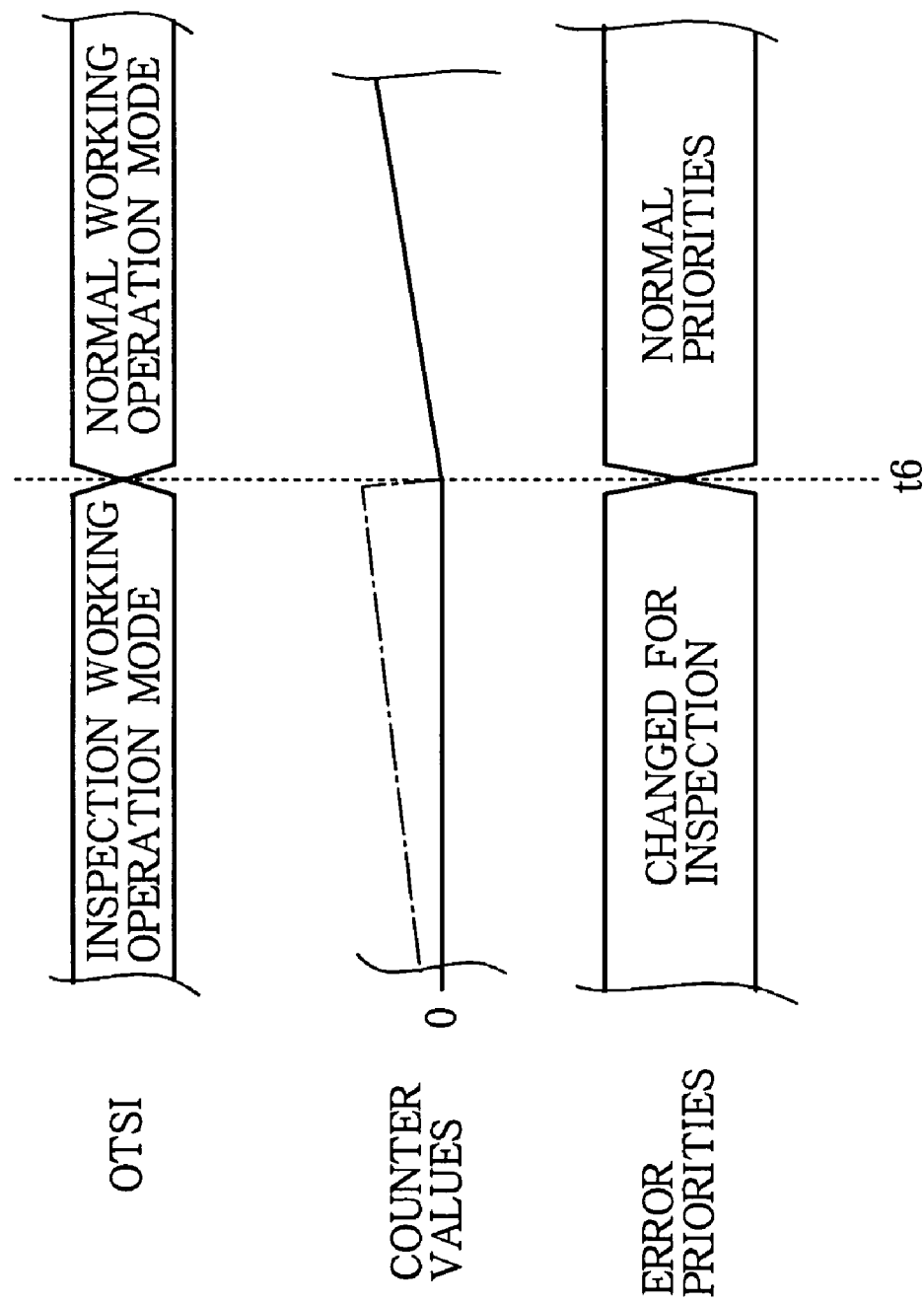

IMAGE FORMING APPARATUS

BACKGROUND OF THE INVENTION

1. Field of the Invention

The present invention relates to an image forming apparatus such as an electrophotographic printer, more particularly to its control system.

2. Description of the Related Art

An image forming apparatus may have a plurality of containers storing paper or other printing media to which images can be transferred. When a host device to which the image forming apparatus is connected sends image data, the host device also sends a command selecting one of the containers, and the apparatus feeds printing media from the selected container. (One example of such an apparatus is described in Japanese Utility Model Application Publication No. H9-368.)

If one of the containers is empty, the apparatus typically displays a notification message, and goes offline until the supply of printing media in the empty container is replenished. Although the user of the host device might prefer to select a different container and carry out image-forming operations with media from that container, this desire is frustrated by the refusal of the image forming apparatus to accept further commands from the host device while in the offline state. The user must either replenish the printing media or wait for someone else to do so.

(The apparatus described in Japanese Utility Model Application Publication No. H9-368 automatically selects a container containing printing media, but this is also problematic, as the apparatus may select a container with printing media on which the user does not wish to form an image.)

Similar inconveniences occur during factory tests and inspections of the image forming apparatus, and during maintenance in the field. Further information will be given in the detailed description of the invention.

SUMMARY OF THE INVENTION

An object of the present invention is to provide an image forming apparatus, equipped with multiple printing media containers, that can switch from an empty container to a container containing printing media on command from a host apparatus.

Another object of the invention is to provide an image forming apparatus with operating modes that facilitate factory testing and inspection.

An image forming apparatus according to a first aspect of the invention has an interface unit for transmitting data to and receiving data from a host device. The image forming apparatus operates in an online state in which commands included in the received data are executed and images are formed according to the received data, and an offline state in which these commands are not executed and images are not formed according to the received data. The image forming apparatus has a plurality of containers for storing and supplying printing media. A data analyzer analyzes the data received from the host device, selects one of the containers to supply printing media on which to form images, and generates container information specifying the selected container. A plurality of sensors sense whether printing media are stored in the containers. A controller switches the image forming apparatus from the online state to the offline state when the image forming apparatus is commanded to form an image if the selected printing media container is empty. Before being commanded to form an image, the image forming apparatus may remain online, even if the selected container is empty, giving the host device an opportunity to send a command switching to another printing media container.

An image forming apparatus according to a second aspect of the invention has a supervisory unit that detects certain error conditions. A mode selector selects a first mode in which the image forming apparatus is switched from the online state to the offline state when these error conditions are detected, and a second mode in which the image forming apparatus remains in the online state even if these error conditions are detected. The second mode is useful during factory tests and inspections, enabling the tester or inspector to force errors to occur without losing control of the image forming apparatus from the host device.

An image forming apparatus according to a third aspect of the invention has a plurality of containers for storing and supplying printing media, a data analyzer for analyzing the data received from the host device and recognizing commands related to the containers, and a plurality of sensors for sensing whether the containers are installed or not. A mode selector selects a first mode in which all commands related to the containers are executed, regardless of whether the containers are actually installed, and a second mode in which a command related to a container is executed only if the container is actually installed. The containers may be options of the image forming apparatus. The second mode can be used at the factory to carry out tests and make settings related to the optional containers even if they are not installed.

An image forming apparatus according to a fourth aspect of the invention has a counter for counting the number of times a component element of the image forming apparatus operates. A supervisory unit detects error conditions in the image forming apparatus. A mode selector selects a first mode in which the error conditions have a first set of priorities and a second mode in which in which the error conditions have a second set of priorities. A controller keeps the counter halted at zero in the first mode, which is useful during the manufacture of the image forming apparatus. The mode selector relieves the manufacturer of the need to set and reset error priorities individually and to clear the counter before shipment to the customer.

BRIEF DESCRIPTION OF THE DRAWINGS

In the attached drawings:

FIG. 12 is a timing diagram illustrating the operation of the image forming apparatus according to the fourth embodiment.

DETAILED DESCRIPTION OF THE INVENTION

Figure 1:
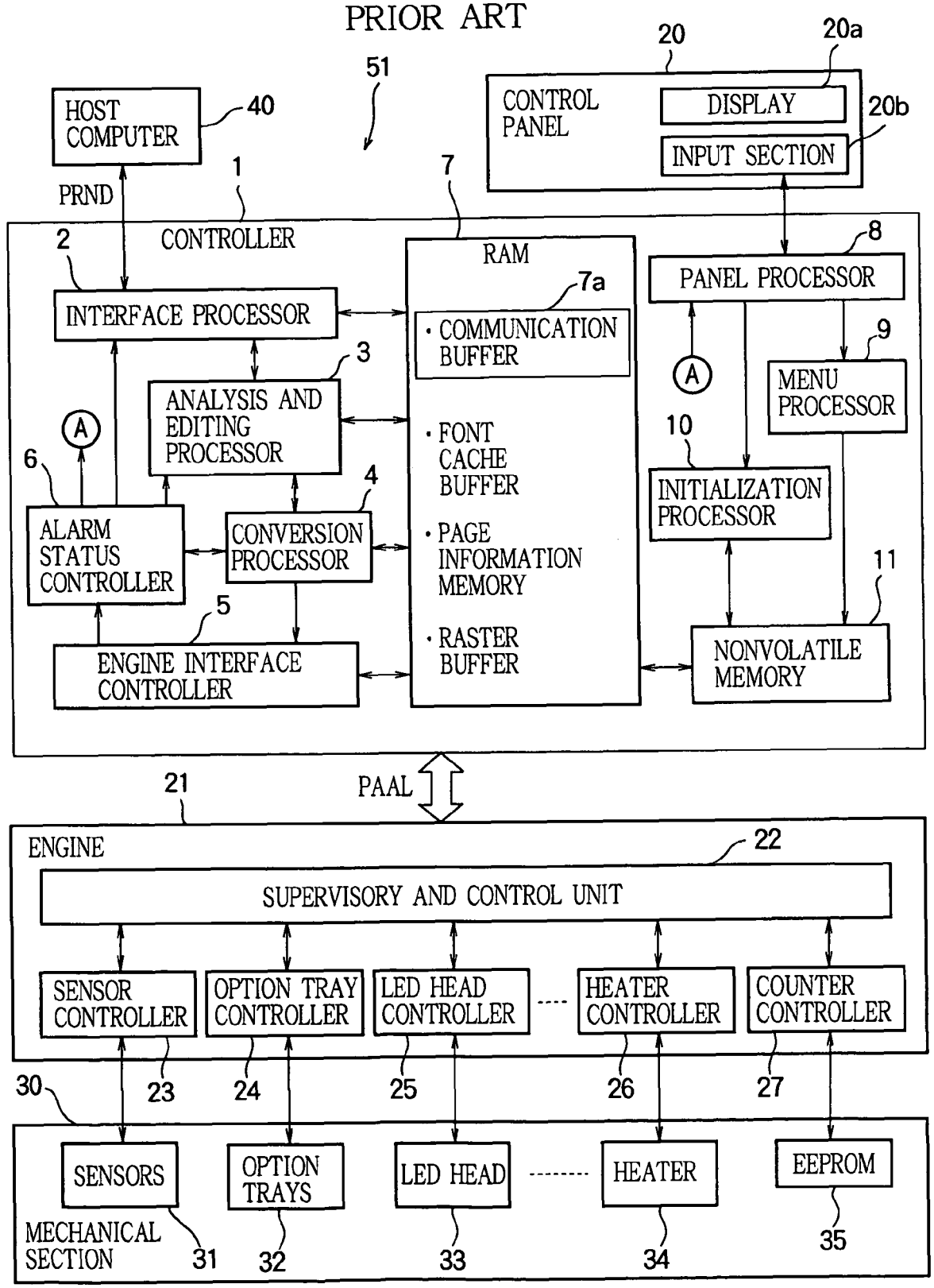
FIG. 1 is a block diagram of the signal processing system of a conventional image forming apparatus.

Embodiments of the invention will be described below with reference to the attached drawings, in which like elements are indicated by like reference characters. First, however, a conventional image forming apparatus from which the embodiments derive will be described, to explain in more detail the technical background of the invention and the problems it addresses. For brevity, the word 'paper' will be used below as a general term denoting any type of printing media on which images may be formed.

The block diagram in FIG. 1 shows the signal processing system of the conventional image forming apparatus 51. The image forming apparatus 51 includes a controller 1 having an interface processor 2 that communicates with a host computer 40 from which print data PRND are received. The host computer 40 may be, for example, a personal computer, a workstation, or any other type of computing device. The general function of the controller 1 is to convert the printing data PRND, which are encoded in a printing language, to bit-mapped printing data, also referred to below as raster data. For this purpose, the controller 1 also includes an analysis and editing processor 3, a conversion processor 4, an engine interface controller 5, an alarm status controller 6, a random access memory (RAM) 7, a panel processor 8, a menu processor 9, an initialization processor 10, and a nonvolatile memory 11.

The image forming apparatus 51 further includes a control panel 20 having a display 20a and an input section 20b, and an engine 21 having a supervisory and control unit 22, a sensor controller 23, an option tray controller 24, an LED head controller 25, a heater controller 26, and a counter controller 27. The engine 21 controls the mechanical section 30 of the image forming apparatus; the mechanical section 30 includes various sensors 31, one or more option trays 32, an LED head 33, a heater 34, and an electrically erasable and programmable read-only memory (EEPROM) 35.

The interface processor 2 in the controller 1 stores printing-language data PRND and commands received from the host computer 40 in a communication buffer 7a in the RAM 7. The interface processor 2 also sends error messages, status information, and the like, which it obtains from the communication buffer 7a, to the host computer 40.

The analysis and editing processor 3 analyzes the data stored in the communication buffer 7a by the interface processor 2, and edits the data if the data are printing-language data. The conversion processor 4 converts the edited data to bit-mapped raster data, compresses and decompresses the raster data, and sends the raster data through the engine interface controller 5 to the engine 21.

The engine interface controller 5 sends raster data and other data to the supervisory and control unit 22 in the engine 21, and receives sensor data and other data from the supervisory and control unit 22.

The alarm status controller 6 receives information from the sensors 31 in the mechanical section 30 through the engine 21 and the engine interface controller 5. On the basis of the sensor information, the alarm status controller 6 sends alarm and status information directly or indirectly to the interface processor 2 and the panel processor 8. The alarm status controller 6 also controls the operation of the interface processor 2 and analysis and editing processor 3.

The RAM 7 includes a font cache buffer, a page information memory area, and a raster buffer as well as the communication buffer 7a.

The panel processor 8 process data sent to and received from the control panel 20. Selection data received from selection keys and other keys in the input section 20b on the control panel 20 are output to the menu processor 9 or the initialization processor 10; status information input from the alarm status controller 6 are sent to the control panel 20 to be displayed on the display 20a. The menu processor 9 processes menu selection information, such as information selecting an initial default paper supply tray, and writes the processed information in the nonvolatile memory 11. The initialization processor 10 processes mode switching information input during maintenance operations and writes the processed information in the nonvolatile memory 11.

In the engine 21, the supervisory and control unit 22 supervises the control units that control and monitor the mechanical section 30, coordinating their operation so that commands are executed at the proper times and the image forming process goes smoothly. The sensor controller 23 monitors the sensors 31 in the mechanical section 30, including paper sensors that detect paper in the paper supply trays, tray sensors that check whether the paper supply trays are installed or not, cover sensors that check whether covers are closed or not, a jam sensor that detects paper jams and other paper feeding failures, a drum cartridge sensor that checks whether the electrophotographic drum cartridge (also referred to below as the image drum or ID) is installed or not, and other sensors. The supervisory and control unit 22, the sensor controller 23, and the sensors 31 constitute a printing media detector, error detector, and container detector.

The option tray controller 24 detects and controls any option trays 32 that are installed in the mechanical section 30. The LED head controller 25 controls the operation of the LED head 33 in the mechanical section 30. The supervisory and control unit 22 coordinates the operation of the LED head controller 25 with the operation of various motors and rollers (not shown) in the mechanical section 30. The heater controller 26 controls the heater 34, which is disposed in a fuser (not shown) located in the paper transport path in the mechanical section 30. The counter controller 27 manages various count values obtained by counters (not shown) in the mechanical section 30 by storing the count values in the EEPROM 35.

The operation of the parts of the image forming apparatus 51 that are particularly related to the present invention will now be described.

One of the sensor signals output by the sensor controller 23 to the supervisory and control unit 22 is a paper end alarm (PEAL) signal generated when a paper sensor detects that a paper supply tray is out of paper. When the engine 21 receives this signal, it sends a paper alarm (PAAL) signal to the controller 1, holding the PAAL signal in the active state. The alarm status controller 6 manages the paper alarm PAAL together with other alarm and status information in the controller 1. At a timing described below, this alarm is sent through the interface processor 2 to the host computer 40 and through the panel processor 8 to the control panel 20.

Figure 2:
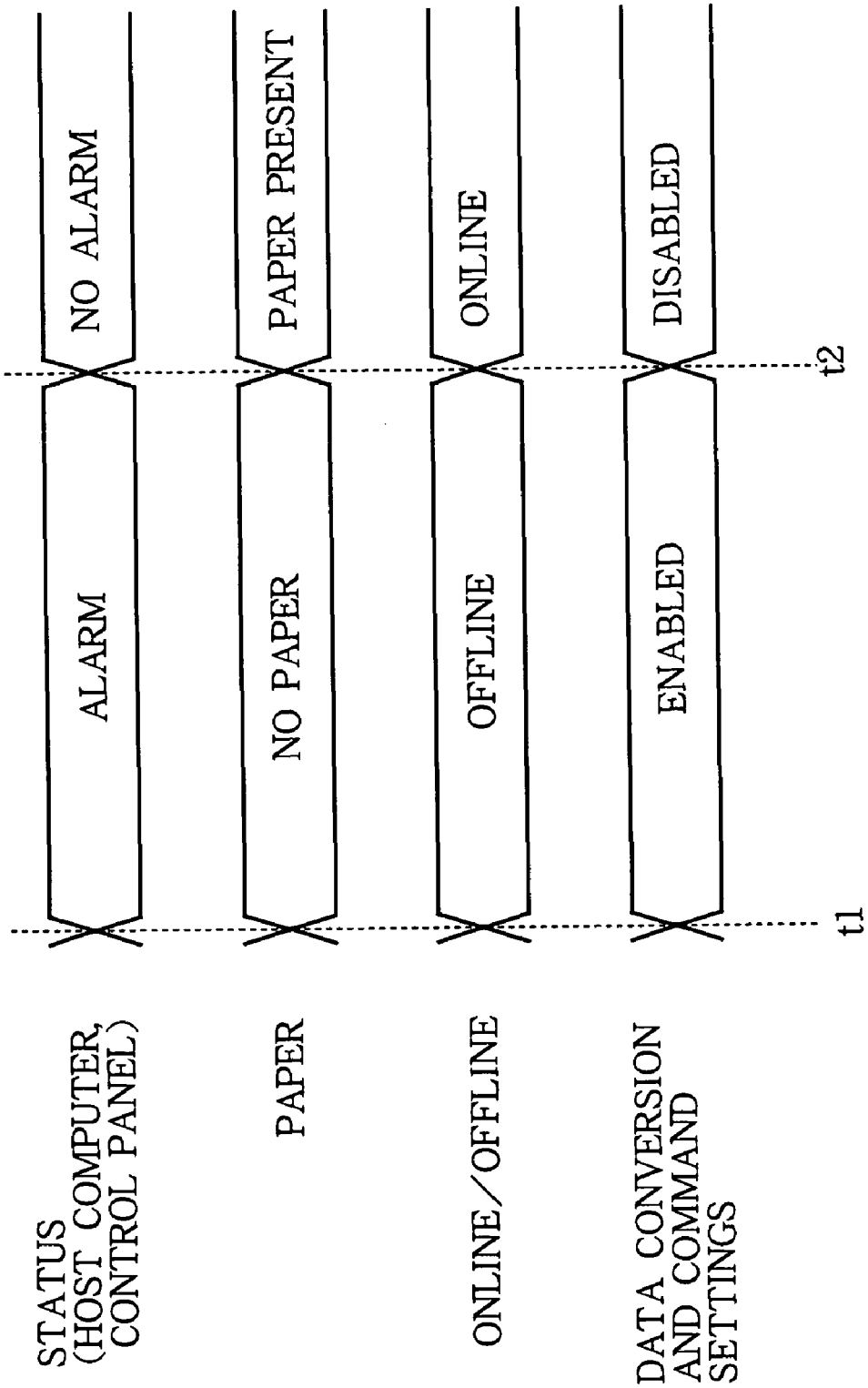
FIG. 2 is a timing diagram illustrating the operation of the conventional image forming apparatus.

The timing diagram in FIG. 2 illustrates the operation of various parts of the image forming apparatus 51 when its power is switched on for normal operation. At time t1, power is switched on. If there is no paper in one of the paper supply trays, the alarm status controller 6 is promptly informed of this by a paper alarm (PAAL) from the engine 21. The alarm status controller 6 halts the operation of the interface processor 2 and analysis and editing processor 3, thereby placing the image forming apparatus 51 offline, and informs the host computer 40 of the offline state by status information in a command reply. The display 20a in the control panel 20 displays an alarm message indicating that the paper supply tray is empty and the image forming apparatus 51 is offline.

If there is paper in all of the paper supply trays when power is switched on at time t1 but the paper in a paper supply tray is used up by a subsequent printing job, similar action is taken by placing the image forming apparatus 51 offline when the tray becomes empty, even if this occurs at the end of the printing job and there is no further printing job to be executed immediately.

The image forming apparatus 51 accordingly reacts to a lack of paper in one of the paper supply trays in the same way as it reacts to a paper jam, by going offline promptly. Unless special action is taken, the image forming apparatus 51 remains offline until paper is replenished. In the offline state, the image forming apparatus 51 cannot generate raster data or change settings by receiving data or commands; analysis and editing operations are halted. Although the host computer 40 may be notified that one of the paper supply trays is empty, this notification takes place just before the image forming apparatus 51 goes offline, or after the image forming apparatus 51 goes offline, not giving the user of the host computer 40 time to send another tray selection command before the offline state is entered. Once the image forming apparatus 51 is offline, the host computer 40 cannot switch the paper supply tray selection because any commands sent from the host computer 40 remain stored in the communication buffer 7a without being executed. This state continues until paper is replenished in the empty tray and the image forming apparatus 51 goes back online.

When the image forming apparatus 51 undergoes outgoing inspection at the factory at which it is manufactured, its factory settings are made and its operation is checked by commands sent from the host computer 40 or operations performed on the control panel 20. Since operations involving the option trays are also checked, the option trays 32 must be installed as well as the normal paper supply trays. The reason is that if, for example, the image forming apparatus receives a command to set a particular option tray to a particular paper size but the option tray is not installed, the image forming apparatus will ignore the command.

Consumable supplies such as the image drum and toner cartridge must also be installed, because if any necessary item is missing, the supervisory and control unit 22 will recognize an error on the basis of the sensor signals detected by the sensor controller 23, and will inform the alarm status controller 6 in the controller 1; the alarm status controller 6 will then place the image forming apparatus 51 in the offline state, rendering further control of the image forming apparatus 51 impossible.

At the end of the factory inspection, the counter values in the EEPROM 35 must be initialized and certain error priorities must be reset. These settings are also made by commands sent from the host computer 40 or operations performed on the control panel 20. In a complex image forming apparatus such as a color printer or a multi-function printer, the number of counters and the number of different types of errors can become quite large, and each setting must be made independently, so this process is time-consuming and mistake-prone.

The operation of the image forming apparatus 51 must also be checked during the manufacturing process before the image forming apparatus 51 is completely assembled. For example, it may be necessary to check the operation of a motor before the upper cover and paper supply trays are installed. Checks may also have to be carried out before various printing-related sensors are installed, or while a sensor is installed but the consumable item that it senses is missing. To prevent the image forming apparatus 51 from going offline, the relevant sensor signal must then be held in the state indicating that the item is installed, even if the item or sensor is not yet installed. This must be done by making temporary mechanical alterations during the manufacturing process.

The manufacturing and inspection process would therefore be considerably simplified if the image forming apparatus 51 were not adapted to go offline whenever any component element or consumable supply was missing, and if the counter values and error priorities could be set or reset in a single operation instead of having to be set and reset individually.

Maintenance and troubleshooting in the field would also be simplified if the image forming apparatus 51 did not go offline, making it impossible to send commands from the host computer 40, whenever a component or consumable supply was removed or an empty paper supply tray was selected.

First Embodiment

Figure 3:
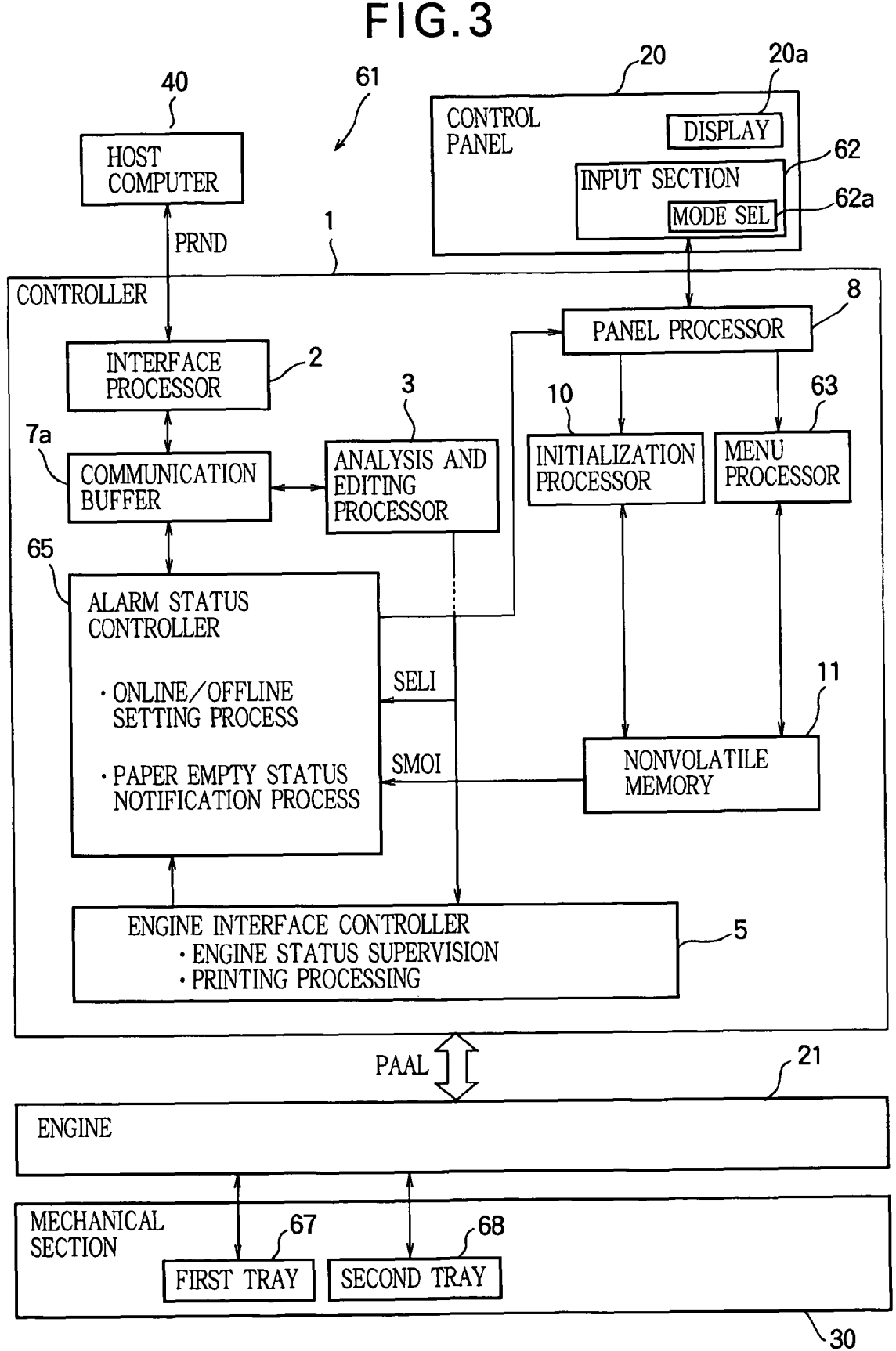
FIG. 3 is a block diagram of the signal processing system of an image forming apparatus according to a first embodiment of the invention.

FIG. 3 illustrates the signal processing system of an image forming apparatus 61 according to a first embodiment of the invention, which addresses the online-offline control problems of the conventional image forming apparatus in normal operation. The controller 1 has a conventional interface processor 2, analysis and editing processor 3, conversion processor, engine interface controller 5, RAM, panel processor 8, initialization processor 10, and nonvolatile memory 11, similar to the corresponding elements in FIG. 1, and a modified menu processor 63 and alarm status controller 65. The controller 1 communicates with a host computer 40 through the interface processor 2, receiving commands and data that are interpreted by the analysis and editing processor (data analyzer) 3. The control panel 20 has a conventional display 20a and a modified input section 62, including a mode selector (MODE SEL) 62a. The image forming apparatus 61 also has a conventional engine 21 and mechanical section 30. To simplify the drawing, the conversion processor and the internal structure of the engine 21 are not shown, only the communication buffer 7a of the RAM is shown, and only two paper supply trays 67, 68, which were omitted from FIG. 1, are shown in the mechanical section 30. Both paper supply trays 67, 68 are containers for storing and supplying printing media. The elements that are not shown in FIG. 3 or not described below operate as in FIG. 1.

The mode selector 62a operates as a mode selector selecting a normal operating mode and an expanded mode. Selected mode information (SMOI) indicating which mode is selected is stored by the menu processor 63 in the nonvolatile memory 11, and read from the nonvolatile memory 11 by the alarm status controller 65.

When the analysis and editing processor 3 receives a command to start printing, it sends selection information (SELI) to the alarm status controller 65 as information specifying the selected container, either the first paper supply tray 67 or the second paper supply tray 68. The selection information (SELI) also includes the command to start printing. The selection information (SELI) is sent through the engine interface controller 5 to the engine 21, as are bit-mapped printing data. If the selected paper supply tray is empty, the engine 21 returns a paper alarm (PAAL), which the engine interface controller 5 passes to the alarm status controller 65, and the alarm status controller 65 executes two processes described below: an online/offline setting process, and a paper empty status notification process.

The supervisory and control unit (shown in FIG. 1) in the engine 21 selects the first paper supply tray 67 or the second paper supply tray 68 as specified by the selection information received from the controller 1, but monitors the presence of paper in both trays 67, 68, and sends the controller 1 a paper alarm (PAAL) if either tray is empty. The paper alarm includes information indicating which paper supply tray is empty.

Figure 4:
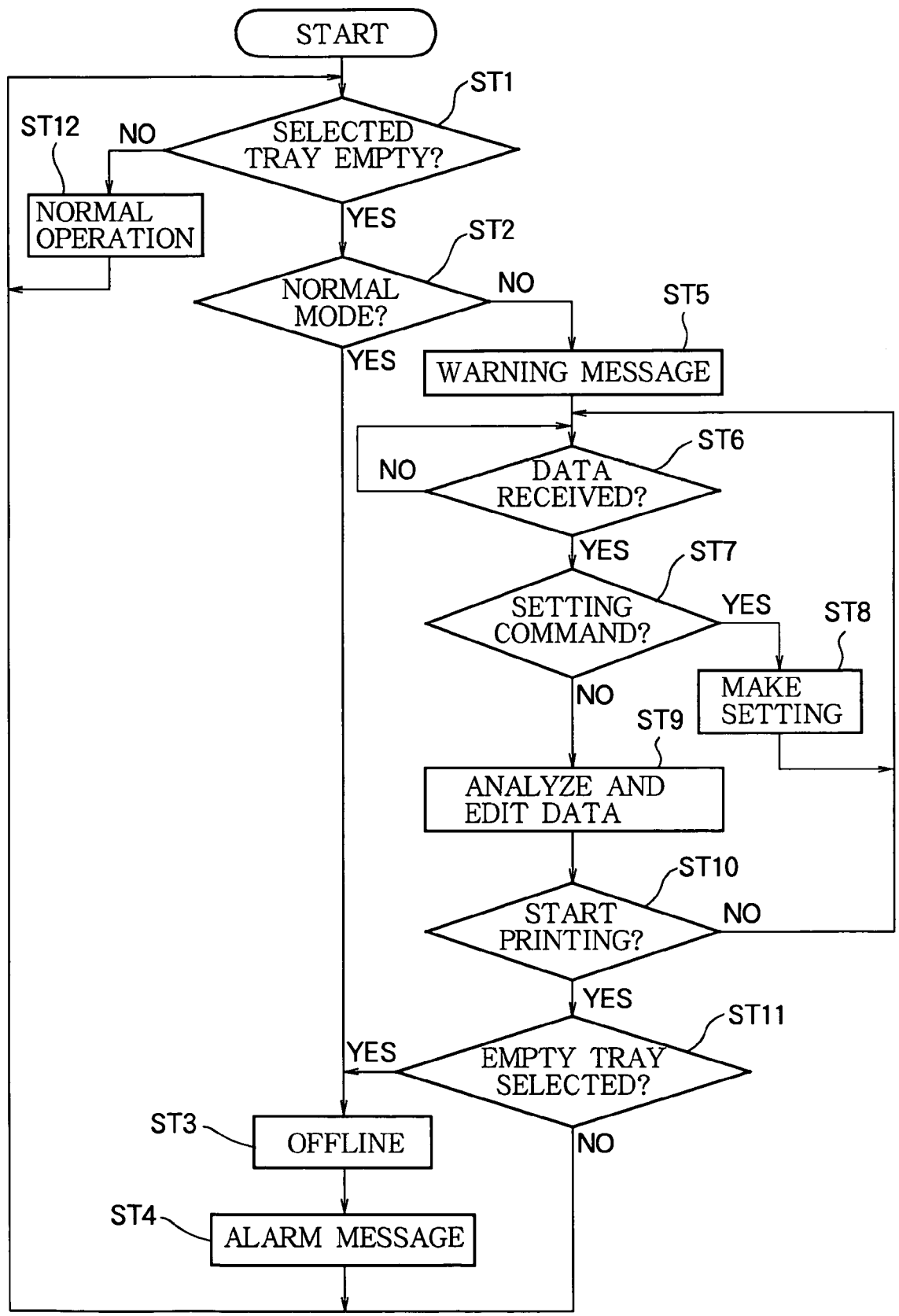
FIG. 4 is a flowchart illustrating the operation of the image forming apparatus according to the first embodiment.

The operation of the image forming apparatus 61 will now be described with reference to the flowchart in FIG. 4.

When the image forming apparatus 61 is powered up, one of the two paper supply trays 67, 68 is automatically selected by, for example, a previous setting made from the control panel 20 or the host computer 40. The image forming apparatus 61 begins by checking whether the selected paper supply tray is empty of paper (step ST1). If there is paper in the selected tray, the image forming apparatus 61 commences normal printing operations (step ST12), which will not be described in detail as they are well known. During these operations, the image forming apparatus 61 continues to monitor the presence of paper in the paper supply trays 67, 68.

If the selected paper supply tray 67 or 68 is empty at power-up, or becomes empty during the course of printing, the image forming apparatus 61 checks the operating mode selected by the mode selector 62a on the control panel 20 (step ST2). If the normal mode is selected, the image forming apparatus 61 emulates the conventional image forming apparatus 51 shown in FIG. 1 by going offline (step ST3) and indicates with an alarm message on the display 20a that it is offline and that the selected paper supply tray is empty (step ST4), thereby carrying out the operations shown at time t1 in FIG. 2. The image forming apparatus 61 also informs the host computer 40 of the paper empty status. After going offline, the image forming apparatus 61 returns to step S1 and waits for the paper to be replenished, or for the operating mode to be changed.

If the expanded mode is selected, the image forming apparatus 61 remains online but sends a warning to the host computer 40 and displays a warning message on the display 20a (step ST5). The image forming apparatus 61 then waits in the online state to receive data from the host computer 40 (step ST6). When the host computer 40 sends data, the image forming apparatus 61 determines whether the data are printing data or a command (step ST7). If the data constitute a command, the image forming apparatus 61 makes the setting required by the command (step ST8), then returns to step ST6 to await further data. The command may be, for example, a command changing the paper supply tray selection from an empty tray to a tray with paper.

If the data are printing data, the analysis and editing processor 3 analyzes and edits the data (step ST9); then the image forming apparatus 61 checks whether it has received the selection information (SELI) necessary to start printing (step ST10). If not, the image forming apparatus 61 returns to step ST6 to await further data. If the selection information (SELI) has been received, the image forming apparatus 61 next determines, from sensor information already received from the mechanical section 30, whether an empty paper supply tray has been selected (step ST11). If so, the image forming apparatus 61 proceeds to step ST3 and goes offline, displays an alarm message (step ST4), then returns to step ST1 to wait for paper to be replenished. If the selected paper supply tray is not empty, because the tray selection has been changed by a command or from the control panel 20, the image forming apparatus 61 proceeds to step ST1 without executing steps ST3 and ST4. Since there is now paper in the selected tray, the image forming apparatus 61 proceeds from step ST1 to step ST12 and commences printing.

Although the selection information (SELI) has been described as selecting the paper supply tray as well as giving the printing start command, since the paper supply tray can also be selected by the initial setting stored in the EEPROM 35, or by a command received from the host computer 40 in step ST8, printing will also commence using paper from a selected paper supply tray if SELI includes only the printing start command. In this case, the information specifying the selected container comprises both SELI and the initial setting or the setting received in step ST8.

Figure 5:
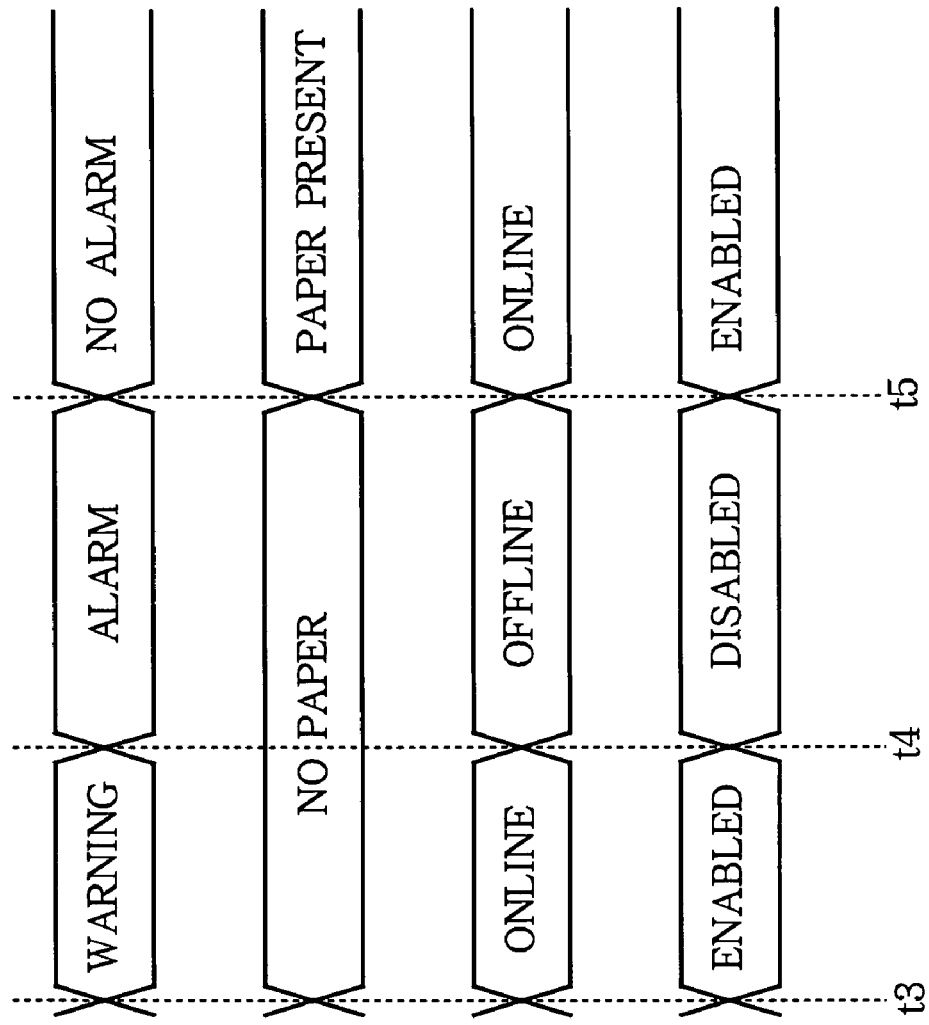
FIG. 5 is a timing diagram illustrating the operation of the image forming apparatus according to the first embodiment.

FIG. 5 shows an example of the operation of the image forming apparatus 61 in the expanded mode.

At time t3, the image forming apparatus 61 is powered up and a paper alarm (PAAL) occurs because the selected paper supply tray, the first paper supply tray 67, for example, is empty. A warning message is displayed, but the image forming apparatus 61 remains online and capable of receiving data and commands from the host computer 40. Prompted by the warning, the user may replenish the paper in the first paper supply tray 67, or send a command from the host computer 40 switching the selection to the second paper supply tray 68, but in the present example it will be assumed that the user takes neither of these actions.

At time t4, a printing start command is received and the analysis and editing processor 3 generates selection information (SELI). The selected paper supply tray is still empty, so the image forming apparatus 61 generates an alarm message and goes offline. In this state, the image forming apparatus 61 may receive further commands and data from the host computer 40, but cannot analyze or execute the commands or edit the data, which remain stored in the communication buffer 7a. In due time, the user notices the alarm message and replenishes the supply of paper in the first paper supply tray 67.

At time t5, a sensor in the mechanical section 30 detects that the paper has been replenished. The control panel 20 clears the paper alarm. The alarm status controller 65 clears the alarm message and reactivates the analysis and editing processor 3, returning the image forming apparatus 61 to the online state. Commands and printing data that have been stored in the communication buffer 7a, and further commands and printing data that may be received from the host computer 40, can now be processed, and the image forming apparatus 61 can commence printing.

In the expanded mode, the image forming apparatus 61 warns the user if the selected paper supply tray is empty at power-up, but does not go offline until commanded to start printing on paper from an empty paper supply tray. The user therefore has an opportunity to switch to a paper supply tray that is not empty before sending the image forming apparatus 61 a printing job. Similarly, if the selected paper supply tray becomes empty at the end of a printing job, the user is warned, but the image forming apparatus 61 remains online, giving the user an opportunity to switch to a non-empty paper supply tray before starting the next printing job.

If the paper supply in the selected paper supply tray is exhausted in the midst of a printing job, then the image forming apparatus 61 goes offline, forcing the user to replenish the paper supply so that the printing job can continue. Similarly, if the selected paper supply tray is exhausted at the end of a printing job but the next printing job has already been received and the next printing job also specifies an empty paper supply tray, the image forming apparatus 61 goes offline, forcing the user to replenish the paper supply so that the next printing job can begin. If the next printing job specifies a paper supply tray that is not empty, then the image forming apparatus 61 switches to the specified paper supply tray and remains online.

In short, in the expanded mode, when the selected paper supply tray is empty, the image forming apparatus 61 displays an alarm message and goes offline if it has already been commanded to form an image on paper from the empty paper supply tray, but displays only a warning message and remains online if it has not yet been commanded to form an image on paper from the empty paper supply tray. In either case, execution of the command to form an image is delayed until paper is replenished, or until a different paper supply tray is selected.

In the normal mode, when the selected paper supply tray is empty, the image forming apparatus 61 always displays an alarm message and goes offline, even if it has not yet been commanded to form an image on paper from the empty paper supply tray.

The user accordingly has a choice of operating modes, but by selecting the expanded mode, the user can avoid having the image forming apparatus 61 go unnecessarily offline before it receives a printing job, simply because the paper supply tray selected at power-up or the paper supply tray selected in the preceding printing job is empty.

In a preferred variation of the first embodiment, when the expanded mode is selected, if the selection information (SELI) necessary to start printing has been received but an empty paper supply tray is selected (Yes in step ST11 in FIG. 4), instead of going offline (step ST3), the image forming apparatus remains online and displays alarm messages indicating that the current printing job has been placed in a standby state and that the selected paper supply tray is empty. Processing of the current printing job is terminated (either at an intermediate point or after the entire job has been received) and the job is left stored in the RAM 7.

In this standby state, if the image forming apparatus receives a command requesting status information, it returns the requested status information. If another job is received, or if another job has already been received, it is processed, and if the other job selects a paper supply tray that is not empty, the job is executed and an image is formed.

When the empty paper supply tray is replenished with paper, the job that was placed in the standby state is executed. If another job is currently being executed, the job that was placed in the standby state is executed after the other job has been completed.

This variation of the first embodiment is particularly advantageous in an image forming apparatus serving multiple users through a network, since it reduces the likelihood that one user will be inconvenienced because another user has selected an empty paper supply tray.

Second Embodiment

Figure 6:
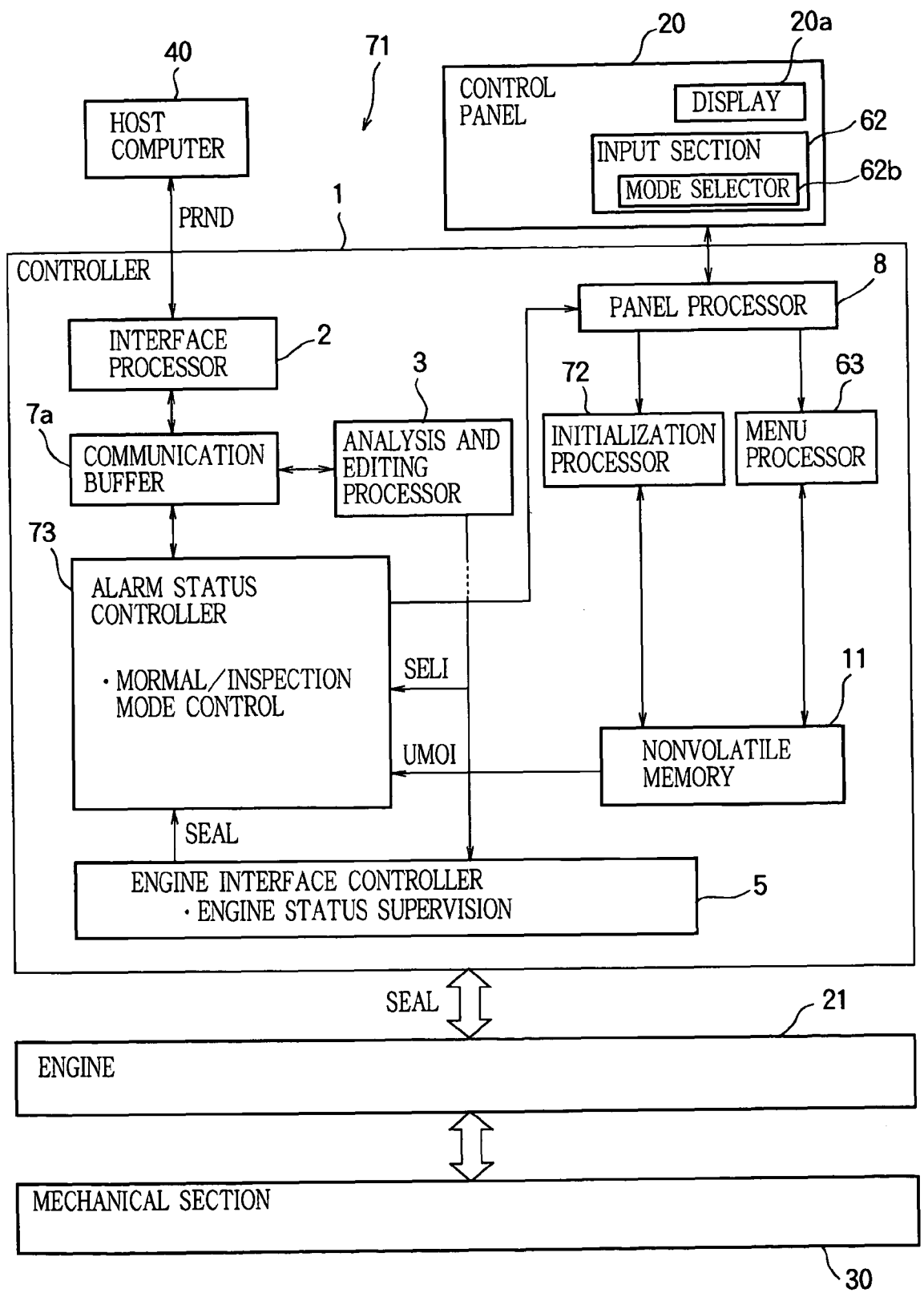
FIG. 6 is a block diagram of the signal processing system of the image forming apparatus according to a second embodiment.

FIG. 6 illustrates the signal processing system of an image forming apparatus 71 according to a second embodiment of the invention, which addresses the problems of the conventional image forming apparatus encountered during maintenance and in the manufacturing process. Even during the manufacturing process, the image forming apparatus 71 may be connected to a host computer 40 as necessary. The controller 1 that communicates with the host computer 40 has a conventional interface processor 2, analysis and editing processor 3, conversion processor, engine interface controller 5, RAM, panel processor 8, and nonvolatile memory 11, similar to the corresponding elements in FIG. 1, a menu processor 63 similar to the one in the second embodiment, and a modified initialization processor 72 and alarm status controller 73. The control panel 20 has a conventional display 20*a* and a modified input section 62, including a mode selector 62*b*. The image forming apparatus 71 also has a conventional engine 21 and mechanical section 30. To simplify the drawing, the conversion processor and the internal structure of the engine 21 and mechanical section 30 are not shown, and only the communication buffer 7*a* of the RAM is shown. The elements that are not shown in FIG. 3 or not described below operate as in the first embodiment.

The mode selector 62*b* operates as a mode selector selecting a normal operating mode and an inspection mode. Mode information (UMOI) indicating which mode is selected is stored by the initialization processor 72 in the nonvolatile memory 11, and read from the nonvolatile memory 11 by the alarm status controller 73.

The mechanical section 30 includes sensors (indicated in FIG. 1) that detect the status of the paper supply trays, paper, drum cartridge, covers, and so on. On the basis of signals from these sensors, the engine 21 generates sensor alarm information (SEAL) indicating conditions such as a missing or empty paper supply tray, missing drum cartridge, open cover, paper jam, and so on, and sends the sensor alarm information to the controller 1. The alarm status controller 73 receives the sensor alarm information and controls the online/offline status of the image forming apparatus 71 accordingly.

Figure 7:
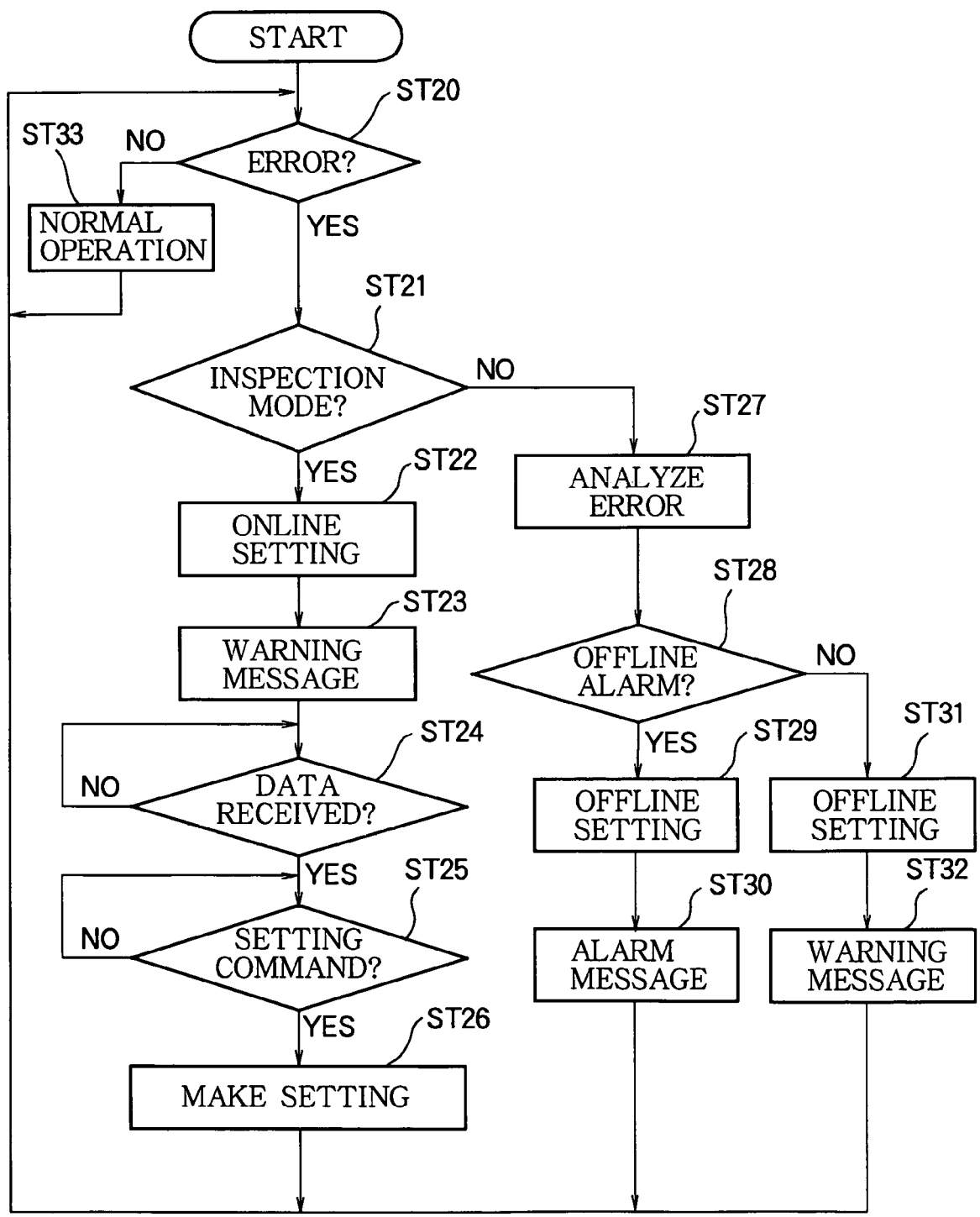
FIG. 7 is a flowchart illustrating the operation of the image forming apparatus according to the second embodiment.

The operation of the image forming apparatus 71 will now be described with reference to the flowchart in FIG. 7.

When the image forming apparatus 71 is powered up, its control program starts by checking the SEAL information to see if any sensor is generating a sensor alarm (step ST20). If there is no sensor alarm, the image forming apparatus 71 commences normal operations (step ST33), which will not be described in detail as they are well known. In these normal operations, the RAM 7 is online, able to receive commands from the host computer 40, and able to execute printing operations. The image forming apparatus 71 also continues to monitor the sensor alarm status.

If there is a sensor alarm, the image forming apparatus 71 checks the operating mode selected by the mode selector 62*b* on the control panel 20, as indicated by the mode information (UMOI) stored in the nonvolatile memory 11 (step ST21).

If the inspection mode is selected, the image forming apparatus 71 remains online regardless of the sensor alarm (step S22), but displays a warning message (step ST23). The warning indicates that, although the image forming apparatus 71 is online, a sensor has detected an alarm. The image forming apparatus 71 then waits to receive data from the host computer 40 (step ST24). When data begin to arrive, the image forming apparatus 71 waits to receive a setting command included in the data (step ST25). When a setting command is received, the image forming apparatus 71 executes the command by making the required setting (step ST26), then returns to step ST20. In the inspection mode, accordingly, the image forming apparatus 71 remains online at all times, so that it can always receive and execute commands and make the commanded settings. If a command that cannot be executed because of an alarm condition is received, such as a command to form an image on paper from an empty paper supply tray, the alarm status controller 73 delays the execution of the command until the alarm condition is cleared.

If the normal mode is selected in step ST21, the image forming apparatus 71 analyzes the sensor alarm information to find out what type of error has occurred (step ST27) and decides accordingly whether to remain online or go offline (step ST28). If the error needs to be dealt with in the offline state, the image forming apparatus 71 goes offline (step ST29) and indicates with an alarm message that it is offline and that an error has occurred (step ST30). If the error is best dealt with in the online state, the image forming apparatus 71 remains online (step ST31) and indicates with a warning message that an error has occurred (step ST32). After step ST30 or ST32, the image forming apparatus 71 returns to step ST20 and the same process is repeated.

The warning and alarm messages displayed in steps ST23, ST30, and ST32 may indicate the location at which the error has occurred; this information can be obtained by analysis of the sensor alarm information SEAL. Alternatively, the warning and alarm messages may simply state that an error has occurred at some unspecified point.

In the inspection mode, since the image forming apparatus 71 remains online even though it may not yet be fully assembled and may be missing an essential component such as the upper cover or a paper supply tray, it can be tested in this state by sending setting commands from the host computer 40 and receiving status information. After being assembled, the image forming apparatus 71 also remains online in the inspection mode even though it may be missing a consumable supply such as paper, the image drum (ID), a toner cartridge, or the like. This greatly facilitates inspection and testing at the factory.

When the image forming apparatus 71 is shipped from the factory, it is set to the normal mode. During maintenance, however, the image forming apparatus 71 can be switched back to the inspection mode by operation of the mode selector 62b on the control panel 20 to facilitate further testing and inspection.

Since the mode selection is stored in the nonvolatile memory 11, the image forming apparatus 71 retains its current mode setting when powered off, and powers up in the same mode the next time its power is switched on. The image forming apparatus 71 can thus be kept in the inspection mode throughout the manufacturing process without the need to select this mode repeatedly, which would be inconvenient. Similarly, after being shipped to the user, the image forming apparatus 71 always operates in the normal mode, unless the inspection mode is reselected for maintenance or repair.

Third Embodiment

Figure 8:
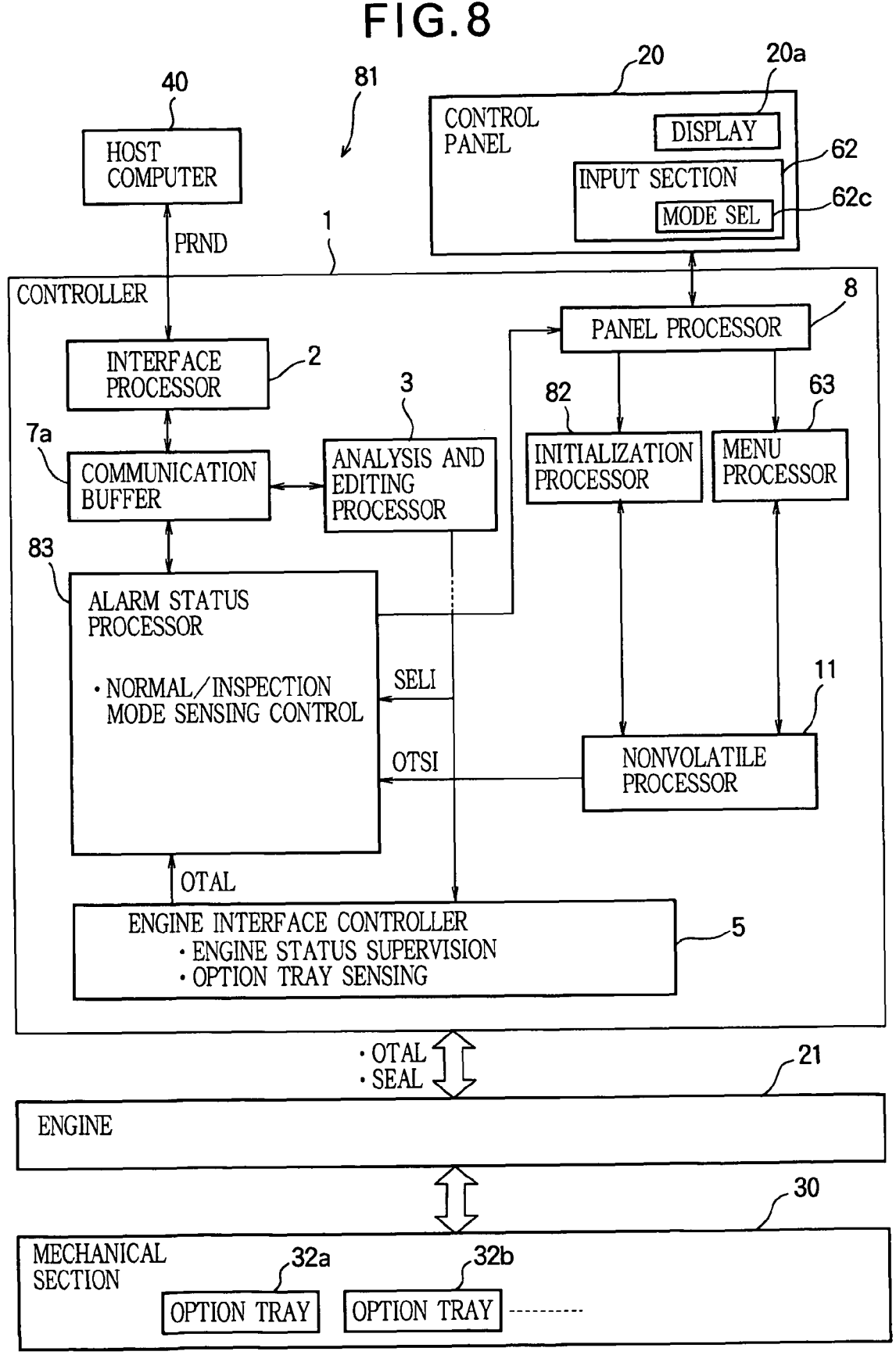
FIG. 8 is a block diagram of the signal processing system of an image forming apparatus according to a third embodiment.

FIG. 8 illustrates the signal processing system of an image forming apparatus 81 according to a third embodiment of the invention, which also addresses the problems of the conventional image forming apparatus during maintenance and in the manufacturing process. The controller 1 that communicates with the host computer 40 has a conventional interface processor 2, analysis and editing processor 3, conversion processor, engine interface controller 5, RAM, panel processor 8, and nonvolatile memory 11, similar to the corresponding elements in FIG. 1, a menu processor 63 similar to the one in the second embodiment, and a modified initialization processor 82 and alarm status controller 83. The control panel 20 has a conventional display 20a and a modified input section 62, including a mode selector 62c. The image forming apparatus 81 also has a conventional engine 21 and mechanical section 30, the latter including at least two option trays 32a, 32b. To simplify the drawing, the remaining internal structure of the mechanical section 30, and the entire internal structure of the engine 21, are not shown; in the controller 1, the conversion processor is omitted, and only the communication buffer 7a of the RAM is shown. The elements that are not shown in FIG. 8 or not described below operate as in the first embodiment.

The mode selector 62c operates as a mode selector selecting an option tray sensing mode. There are two such modes: a normal sensing mode used by the user, and an inspection sensing mode used during factory tests and maintenance. Option tray sensing mode information (OTSI) indicating which mode is selected is stored by the initialization processor 82 in the nonvolatile memory 11, and read from the nonvolatile memory 11 by the alarm status controller 83.

The engine 21 sends the controller 1 both sensor alarm information (SEAL), indicating various alarm conditions, and option tray availability information (OTAL), indicating which option trays 32a, 32b, ... are installed. Besides reading the option tray sensing mode information (OTSI), the alarm status controller 83 receives the option tray availability information (OTAL), and uses it in carrying out option tray simulation as described below.

Figure 9:
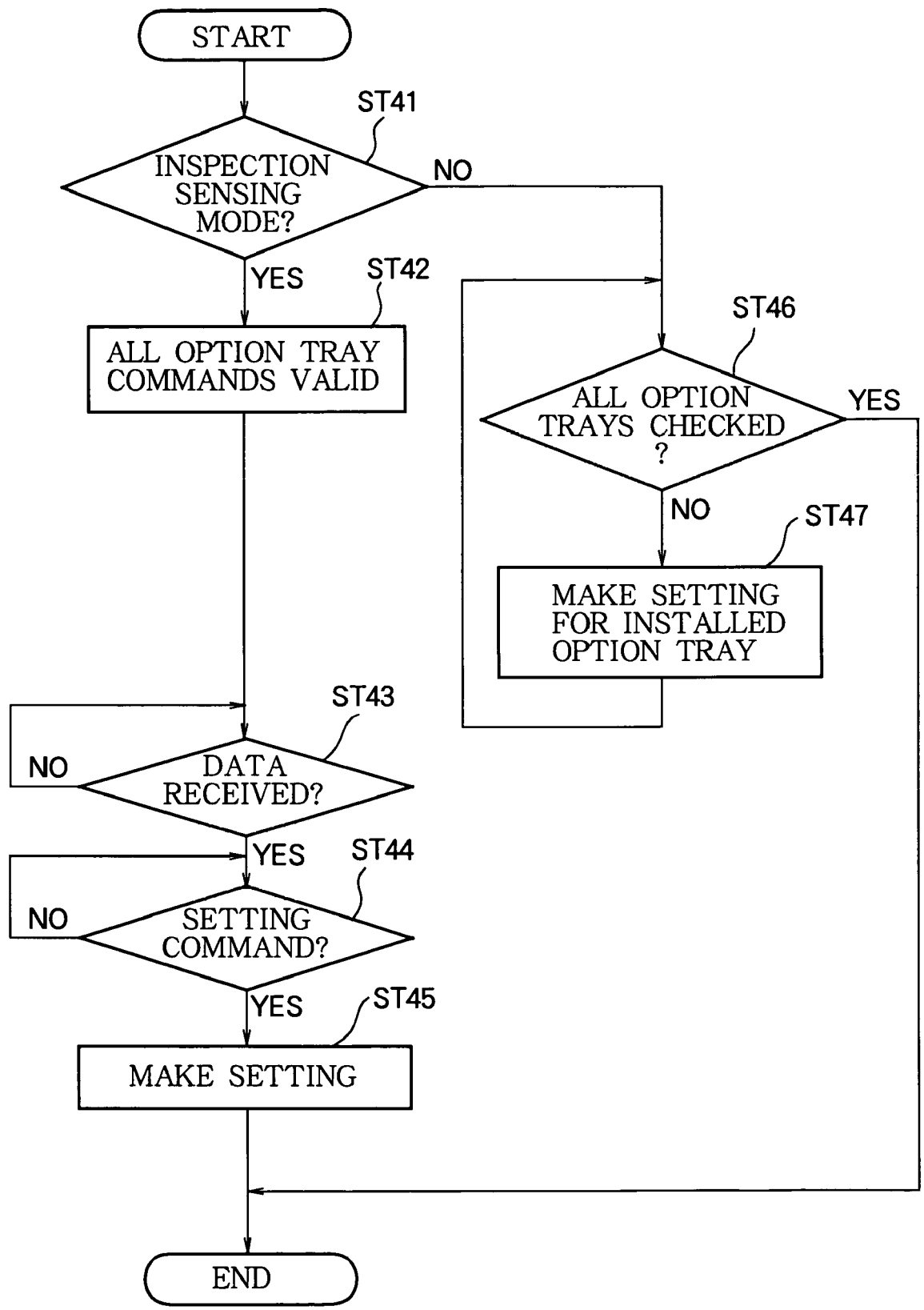
FIG. 9 is a flowchart illustrating the operation of the image forming apparatus according to the third embodiment.

The operation of the image forming apparatus 81 will now be described with reference to the flowchart in FIG. 9.

When the image forming apparatus 81 is powered up, its control program starts by checking the option tray sensing mode information (OTSI) set by the mode selector 62c on the control panel 20 to determine whether the normal sensing mode or the inspection sensing mode is selected (step ST41).

If the inspection sensing mode is selected, the image forming apparatus 81 enters an option tray simulation mode in which all option tray commands are valid, regardless of whether the option tray availability information (OTAL) indicates that the relevant option tray is installed or not (step ST42). The image forming apparatus 81 then waits to receive data from the host computer 40 (step ST43). When data begin to arrive, the image forming apparatus 81 waits to receive a setting command included in the data (step ST44). When a setting command is received, the image forming apparatus 81 executes the command by making the required setting (step ST45).

In the inspection sensing mode, accordingly, the image forming apparatus 81 simulates a situation in which all possible option trays are installed, enabling the host computer 40 to send commands related to any option tray, and enabling the settings specified by the commands to be carried out. In particular, the necessary factory settings relating to an option tray can be made even if the option tray is not installed, and non-mechanical tests of the functions of the non-installed option tray can be performed.

If the normal sensing mode has been selected by the mode selector 62c on the control panel 20, the availability of each option tray is checked (step ST46) and settings related to the installed option trays are performed (step ST47).

The inspection sensing mode is particularly useful during the manufacturing and inspection process at the factory, since it enables the manufacturer to carry out tests and settings without going to the trouble of actually installing all possible option trays, which may be impractical at some points in the manufacturing process. Moreover, since the inspection sensing mode can be selected from the control panel 20, it can be used to facilitate maintenance and repair in the field. It is also convenient that the sensing mode information is stored in the nonvolatile memory 11, so that the sensing mode does not have to be selected manually every time the image forming apparatus 81 is powered up.

Fourth Embodiment

Figure 10:
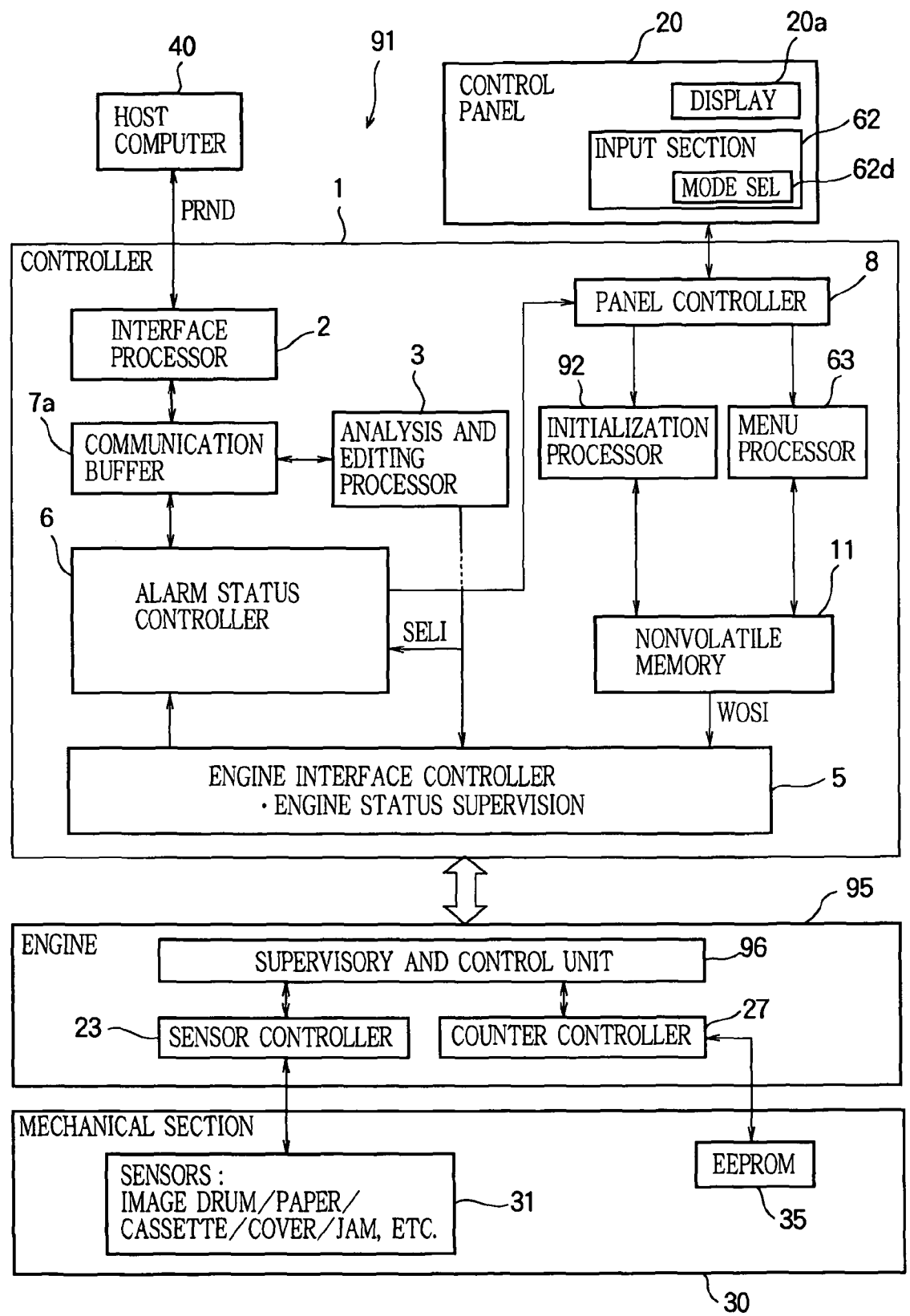
FIG. 10 is a block diagram of the signal processing system of an image forming apparatus according to a fourth embodiment.

FIG. 10 illustrates the signal processing system of an image forming apparatus 91 according to a fourth embodiment of the invention, which also addresses the problems of the conventional image forming apparatus during maintenance and in the manufacturing process. The controller 1 that communicates with the host computer 40 has a conventional interface processor 2, analysis and editing processor 3, conversion processor, engine interface controller 5, alarm status controller 6, RAM, panel processor 8, and nonvolatile memory 11, similar to the corresponding elements in FIG. 1, a menu processor 63 similar to the one in the second embodiment, and a modified initialization processor 92. The control panel 20 has a conventional display 20a and a modified input section 62, including a mode selector 62d. The engine 95 has a modified supervisory and control unit 96 but the other component elements of the engine 95, including the sensor controller 23 and a counter controller 27, are as described in the first embodiment. The mechanical section 30, including the sensors 31 and an EEPROM 35, is also as described in the first embodiment. The sensors 31 include, for example, an image drum sensor, paper sensors, cassette sensors, cover sensors, jam sensors, and so on. Other components of the engine 95 and mechanical section 30 have been omitted to simplify the drawing. In the controller 1, the conversion processor is omitted for the same reason, and only the communication buffer 7a of the RAM is shown. The elements that are not shown in FIG. 10 or not described below operate as in the preceding embodiments.

The mode selector 62d operates as a mode selector selecting a working operation mode. There are two such modes: a normal working operation mode used by the user, and an inspection working operation mode used during the manufacturing process. Selection information (WOSI) indicating which mode is selected is stored by the initialization processor 92 in the nonvolatile memory 11, and sent through the engine interface controller 5 to the supervisory and control unit 96 in the engine 95.

When the inspection working operation mode is selected, the supervisory and control unit 96 prevents the counter controller 27 from incrementing the drum rotation count, page count, remaining toner value, total printing count, and other counts maintained in the EEPROM 35, so that all of their values remain zero.

At various stages in the manufacturing process, error priorities are changed and errors that would ordinarily be non-recoverable if detected by the sensors are forced to occur in order to carry out more robust inspections and tests of the image forming apparatus, which may not yet be fully assembled. All of these error priority changes are collected into a single group and carried out in a single operation in the inspection working operation mode.

The operation of the image forming apparatus 91 will now be described with reference to the flowchart in FIG. 11 and the timing diagram in FIG. 12.

Figure 11:
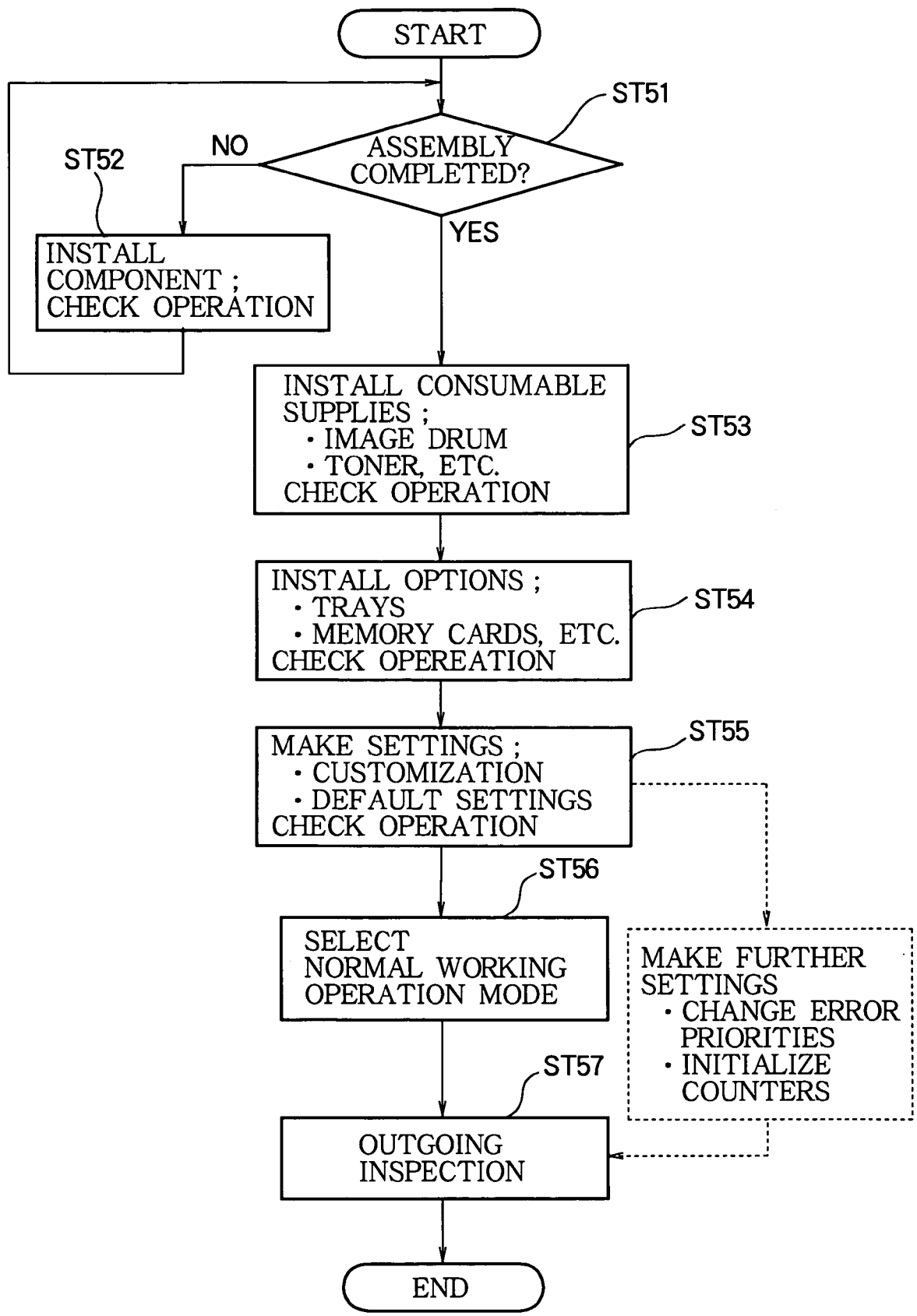
FIG. 11 is a flowchart illustrating the operation of the image forming apparatus according to the fourth embodiment.

FIG. 11 depicts the assembly process and the final setting and inspection process. The assembly process is carried out in steps ST51 and ST52: components are installed and inspected one by one in step ST52 until assembly is completed as determined in step ST51. During these steps, the inspection working operation mode is selected by the mode selector 62d.

Next, consumable supplies such as the image drum 53 are installed and the operation of the image forming apparatus 91 is checked (step ST53). This is followed by the installation and testing of options such as option trays and memory cards (step ST54). Settings are then made, including default settings, settings to adapt the image forming apparatus 91 for use in a certain environment or by a certain type of customer, and other settings (step ST55). The image forming apparatus 91 remains in the inspection working operation mode during these steps. The mode selector 62d is then used to switch from the inspection working operation mode to the normal working operation mode (step ST56), and a final outgoing inspection is performed (step ST57). During the outgoing inspection, altered error priorities are cleared, counters are incremented, and the image forming apparatus 91 operates as it will in the field.

In FIG. 12, the image forming apparatus 91 is switched from the inspection working operation mode to the normal working operation mode at time t6. In the inspection working operation mode before time t6, error priorities are altered to enable robust tests to be performed, and the counter values remain constant at zero. In the normal working operation mode after time t6, the altered error priorities are cleared, and the counter values are incremented.

If the inspection working operation mode were not available, counter values would be incremented during at least the testing of consumable supplies and options in steps ST53 and ST54 in FIG. 11, and each counter value would have to be individually reset to zero in an extra process indicated by dotted lines in FIG. 11. Error priorities would also have to be reset in this extra process. Step ST56 replaces all of this extra work with a single mode selection.

The fourth embodiment accordingly shortens the manufacturing process by relieving the manufacturer of the need to change numerous error priorities and reset numerous counter values individually, replacing all of this time-consuming and mistake-prone work with a single mode selection.

The preceding embodiments have been described separately, but some or all of them may be combined in a single image forming apparatus.

Those skilled in the art will recognize that further variations are possible within the scope of the invention, which is defined in the appended claims.

What is claimed is:

1. An image forming apparatus having a container for storing and supplying printing media, the image forming apparatus comprising:
   a supervisory unit for checking whether the printing media are present in the container;
   a processor for indicating that the printing media are not present, when the supervisory unit finds that the printing media are not present in the container;
   an interface unit for receiving printing commands and printing data; and
   a controller for placing the image forming apparatus in an online state to receive the printing commands and the printing data, when the printing media are not present in the container at a power-up of the image forming apparatus, receiving the printing commands and the printing data, and placing the image forming apparatus in an offline state when one of the printing commands selects to use the printing media from the container.

2. The image forming apparatus of claim 1, further comprising a mode selector for selecting a first mode and a second mode, wherein:
   if the first mode is selected and the printing media are not present in the container at the power-up of the image forming apparatus, the controller places the image forming apparatus in the online state and controls the interface unit to receive the printing commands and printing data; and
   if the second mode is selected and the printing media are not present in the container at the power-up of the image forming apparatus, the controller places the image forming apparatus in the offline state and halts reception by the interface unit of the printing commands and printing data.

3. The image forming apparatus of claim 2, further comprising a nonvolatile memory for storing selection information indicating the mode selected by the mode selector.

4. The image forming apparatus of claim 1, wherein the controller places the image forming apparatus in the offline state only if the printing media are not present in the container indicated by the printing command.

5. The image forming apparatus of claim 1, further comprising a control panel with a display, wherein the processor indicates that printing media are not present by displaying a warning message on the display.

6. The image forming apparatus of claim 1, wherein the interface unit receives the printing data and printing commands from a host computer and the processor indicates that printing media are not present by sending a warning to the host computer.

7. An image forming apparatus comprising:
a container for storing and supplying printing media;
an interface unit for receiving a printing job having a last page;
a printing engine for printing the printing job;
a supervisory unit for checking whether the printing media are present in the container; and
a controller for placing the image forming apparatus in an offline state if the supervisory unit detects that the printing media in the container have been exhausted during the printing job but before the last page of the printing job, and leaving the image forming apparatus in an online state for receiving printing commands and printing data, if the supervisory unit detects that the printing media in the container have been exhausted by the printing of the last page of the printing job.

8. The image forming apparatus of claim 7, wherein the controller places the image forming apparatus in the offline state only if the printing media are not present in the container indicated by the printing command.

9. The image forming apparatus of claim 7, further comprising a mode selector for selecting a first mode and a second mode, wherein:
if the first mode is selected, the controller controls the interface unit to continue to receive the printing job in the offline state; and
if the second mode is selected, the controller halts reception by the interface unit of data from the printing job in the offline state.

10. The image forming apparatus of claim 9, further comprising a nonvolatile memory for storing selection information indicating the mode selected by the mode selector.

* * * * *